(12) United States Patent
Wilson et al.

(10) Patent No.: US 11,194,072 B2
(45) Date of Patent: Dec. 7, 2021

(54) GENERATING AN EARTH MODEL FROM SPATIAL CORRELATIONS OF EQUIVALENT EARTH MODELS

(71) Applicant: Halliburton Energy Services, Inc., Houston, TX (US)

(72) Inventors: Glenn A. Wilson, Houston, TX (US); Burkay Donderici, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 546 days.

(21) Appl. No.: 15/771,801

(22) PCT Filed: Feb. 16, 2016

(86) PCT No.: PCT/US2016/018016
§ 371 (c)(1),
(2) Date: Apr. 27, 2018

(87) PCT Pub. No.: WO2017/142509
PCT Pub. Date: Aug. 24, 2017

(65) Prior Publication Data
US 2018/0348395 A1  Dec. 6, 2018

(51) Int. Cl.
*G01V 3/38* (2006.01)
*G01V 3/30* (2006.01)
*G01V 3/32* (2006.01)

(52) U.S. Cl.
CPC ............... *G01V 3/38* (2013.01); *G01V 3/30* (2013.01); *G01V 3/32* (2013.01)

(58) Field of Classification Search
CPC ... G01V 3/38; G01V 3/30; G01V 3/32; G06F 30/20
See application file for complete search history.

(56) References Cited

U.S. PATENT DOCUMENTS

| 6,594,584 B1 | 7/2003 | Omeragic et al. |
| 2005/0140373 A1* | 6/2005 | Li .......................... G01V 3/30 324/338 |

(Continued)

FOREIGN PATENT DOCUMENTS

| WO | 2014124204 A1 | 8/2014 |
| WO | 2016111678 A1 | 7/2016 |

(Continued)

OTHER PUBLICATIONS

Omeragic, D., et al., "3D Reservoir Characterization and Well Placement in Complex Scenarios Using Azimuthal Measurements While Drilling," SPWLA 50th Annual Logging Symposium, Jun. 21-24, 2009, 16 pages.

(Continued)

*Primary Examiner* — Bijan Mapar
(74) *Attorney, Agent, or Firm* — Benjamin Ford; Parker Justiss, P.C.

(57) ABSTRACT

A logging system includes an electromagnetic logging tool that collects at least one measurement of a subterranean formation at a borehole. The logging system also includes a processing system that generates a plurality of earth models of the subterranean formation based on the at least one measurement of the subterranean formation. The processing system projects at least one second earth model upon a well path of the borehole, and selects a model of the plurality of models based on a spatial correlation between at least one parameter of the selected model and a corresponding at least one parameter of the at least one second earth model.

18 Claims, 6 Drawing Sheets

(56) References Cited

U.S. PATENT DOCUMENTS

| | | |
|---|---|---|
| 2009/0119075 A1 | 5/2009 | Jaworski et al. |
| 2009/0119076 A1 | 5/2009 | Madatov et al. |
| 2010/0185422 A1 | 7/2010 | Hoversten |
| 2012/0080197 A1 | 4/2012 | Dickens et al. |
| 2013/0046474 A1 | 2/2013 | Bittar et al. |
| 2013/0166262 A1 | 6/2013 | Shook et al. |
| 2013/0226461 A1* | 8/2013 | Yu .......................... E21B 47/00 702/9 |

FOREIGN PATENT DOCUMENTS

| | | |
|---|---|---|
| WO | 2016111685 A1 | 7/2016 |
| WO | 2017142509 A1 | 8/2017 |

OTHER PUBLICATIONS

Zhdanov, M.S., et al., "Exploring multiple 3D inversion scenarios for enhanced interpretation of marine CSEM data: an iterative migration analysis of the Shtokman gas field," First break, vol. 28, Mar. 2010, pp. 95-101, www.firstbreak.org.

Sviridov, M., et al., "New Software for Processing of LWD Extradeep Resistivity and Azimuthal Resistivity Data," SPE Reservoir Evaluation & Engineering, May 2014, pp. 109-127.

Seydoux, J., et al., "Full 3D Deep Directional Resistivity Measurements Optimize Well Placement and Provide Reservoir-Scale Imaging While Drilling," SPWLA 55th Annual Logging Symposium, May 18-22, 2014, 14 pages.

\* cited by examiner

GENERATING AN EARTH MODEL FROM SPATIAL CORRELATIONS OF EQUIVALENT EARTH MODELS

CROSS-REFERENCE TO RELATED APPLICATION

This application is the National Stage of, and therefore claims the benefit of, International Application No. PCT/US2016/018016 filed on Feb. 16, 2016, entitled "GENERATING AN EARTH MODEL FROM SPATIAL CORRELATIONS OF EQUIVALENT EARTH MODELS," which was published in English under International Publication Number WO 2017/142509 on Aug. 24, 2017. The above application is commonly assigned with this National Stage application and is incorporated herein by reference in its entirety.

BACKGROUND

In the field of well drilling and logging, resistivity logging tools are used to provide an indication of the electrical resistivity of rock formations surrounding an earth borehole. Such information regarding resistivity is useful in ascertaining the presence or absence of fluids, such as hydrocarbons. A typical electromagnetic propagation resistivity logging tool includes at least one transmitting antenna and multiple receiving antennas located at different distances from the transmitting antenna along the axis of the tool.

The transmitting antenna is used to generate electromagnetic fields in the surrounding formation. In turn, the electromagnetic fields in the formation induce a voltage in each receiving antenna. The response of the formation is converted into a set of inversion parameters, which are then used to estimate the anisotropic properties of the formation.

Inversion can be performed on a point-by-point basis during logging of a borehole. At each of two or more points (or locations) along a length (or stretch) of the borehole, the process described in the above paragraph is performed. A whole-space or "zero-dimensional" or "0D" inversion takes into account the tool measurements at only a single point and ignores formation heterogeneity. To deal with formation heterogeneity, such as shoulder effects from formation layer boundaries, a layered earth or "one-dimensional" or "1D" inversion takes into account the tool measurements from at least a single point to find a layered formation model that matches those measurements. Accordingly, a 1D inversion can be used to determine the locations of boundaries between formation layers.

BRIEF DESCRIPTION OF THE DRAWINGS

There are disclosed in the drawings and the following description methods and systems employing logging measurements for selecting a formation model from two or more formation models. In the drawings.

It should be understood, however, that the specific embodiments given in the drawings and detailed description do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

Disclosed herein are methods and systems for quantitatively interpreting logging-while-drilling (LWD) data (e.g., resistivity LWD data). Particular embodiments relate to selecting a formation model from two or more generated formation models. In at least some embodiments, a method includes generating a plurality of earth models of the subterranean formation based on at least one measurement of the subterranean formation at a borehole. The method further includes projecting at least one second earth model upon a well path of the borehole. The method further includes selecting a model of the plurality of earth models based on a spatial correlation between at least one parameter of the selected model and a corresponding at least one parameter of the projected at least one second earth model.

A related system includes an electromagnetic logging tool that collects at least one measurement of a subterranean formation at a borehole. The logging system also includes a processing system that generates a plurality of earth models of the subterranean formation based on the at least one measurement of the subterranean formation. The processing system projects at least one second earth model upon a well path of the borehole, and selects a model of the plurality of earth models based on a spatial correlation between at least one parameter of the selected model and a corresponding at least one parameter of the projected at least one second earth model.

Figure 1:
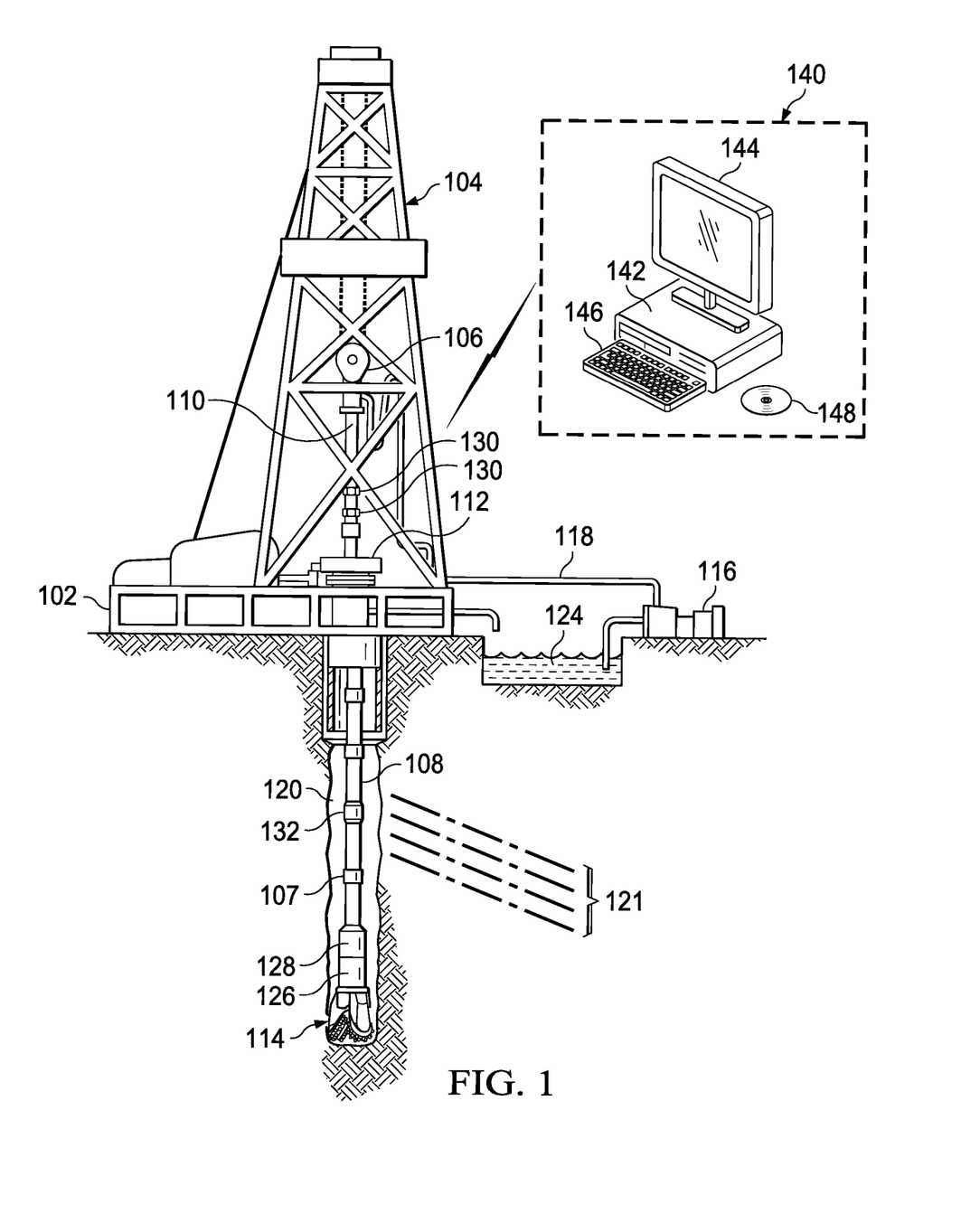
FIG. 1 shows an illustrative logging while drilling (LWD) environment.

An illustrative LWD environment is shown in FIG. 1. A drilling platform 102 is equipped with a derrick 104 that supports a hoist 106 for raising and lowering a drill string 108. The hoist 106 suspends a top drive 110 that is used to rotate the drill string 108 and to lower the drill string through the well head 112. Sections of the drill string 108 are connected by threaded connectors 107. Connected to the lower end of the drill string 108 is a drill bit 114. Rotation of bit 114 creates a borehole 120 that passes through various formations 121. A pump 116 circulates drilling fluid through a supply pipe 118 to top drive 110, downhole through the interior of drill string 108, through orifices in drill bit 114, back to the surface via the annulus around the drill string, and into a retention pit 124. The drilling fluid transports cuttings from the borehole 120 into the pit 124 and aids in maintaining the integrity of the borehole.

A logging tool 126 is integrated into the bottom-hole assembly near the bit 114. The logging tool 126 may take the form of a drill collar, e.g., a thick-walled tubular that provides weight and rigidity to aid the drilling process. In at least one embodiment, the logging tool 126 is an electromagnetic resistivity LWD tool. For example, the logging tool 126 may be an Azimuthal Deep Resistivity (ADR) service offered by Halliburton Energy Services, Inc., operating in a rotating (drilling) mode. As the bit 114 extends the borehole 120 through the formations 121, the logging tool 126 collects measurements relating to various formation properties as well as the tool orientation and position and various other drilling conditions.

In wells employing mud pulse telemetry for LWD, downhole sensors (including resistivity logging tool 126) are coupled to a telemetry module 128 including a mud pulse telemetry transmitter that transmits telemetry signals in the form of pressure variations in the tubing wall of drill string 108. A mud pulse telemetry receiver array 130 (including, e.g., one or more pressure transducers) may be coupled to tubing below the top drive 110 to receive transmitted telemetry signals. Other telemetry techniques can be employed including acoustic telemetry (using, e.g., one or more repeater modules 132, to receive and retransmit telemetry signals), electromagnetic telemetry, and wired drill pipe telemetry. Many telemetry techniques also offer the ability to transfer commands from the surface to the tool, thereby enabling adjustment of the tool's configuration and operating parameters. In at least some embodiments, the telemetry module 128 additionally, or alternatively, stores measurements for later retrieval when the tool returns to the surface.

A computer system (or processing system) 140 collects measurements from the logging tool 126 (e.g., via the receiver array 130), and includes computing facilities for processing and storing the measurements gathered by the logging tool. In at least some embodiments, the computer system 140 includes a processor 142 that performs formation modeling analysis operations by executing software or instructions obtained from a local or remote non-transitory computer-readable medium 148. The processor 142 may be, for example, a general purpose microprocessor, a microcontroller, a digital signal processor, an application specific integrated circuit, a field programmable gate array, a programmable logic device, a controller, a state machine, gated logic, discrete hardware components, an artificial neural network, or any like suitable entity that can perform calculations or other manipulations of data. In at least some embodiments, computer hardware can further include elements such as, for example, a memory (e.g., random access memory (RAM), flash memory, read only memory (ROM), programmable read only memory (PROM), erasable read only memory (EPROM)), registers, hard disks, removable disks, CD-ROMS, DVDs, or any other like suitable storage device or medium. The computer system 140 also may include input device(s) 146 (e.g., a keyboard, mouse, touchpad, etc.) and output device(s) 144 (e.g., a monitor, printer, etc.). Such input device(s) 146 and/or output device(s) 144 provide a user interface that enables an operator to interact with the logging tool 126 and/or software executed by the processor 142. For example, the computer system 140 may enable an operator to select resistivity analysis options, to view collected resistivity data, to view resistivity analysis results, and/or to perform other tasks.

Figure 2:
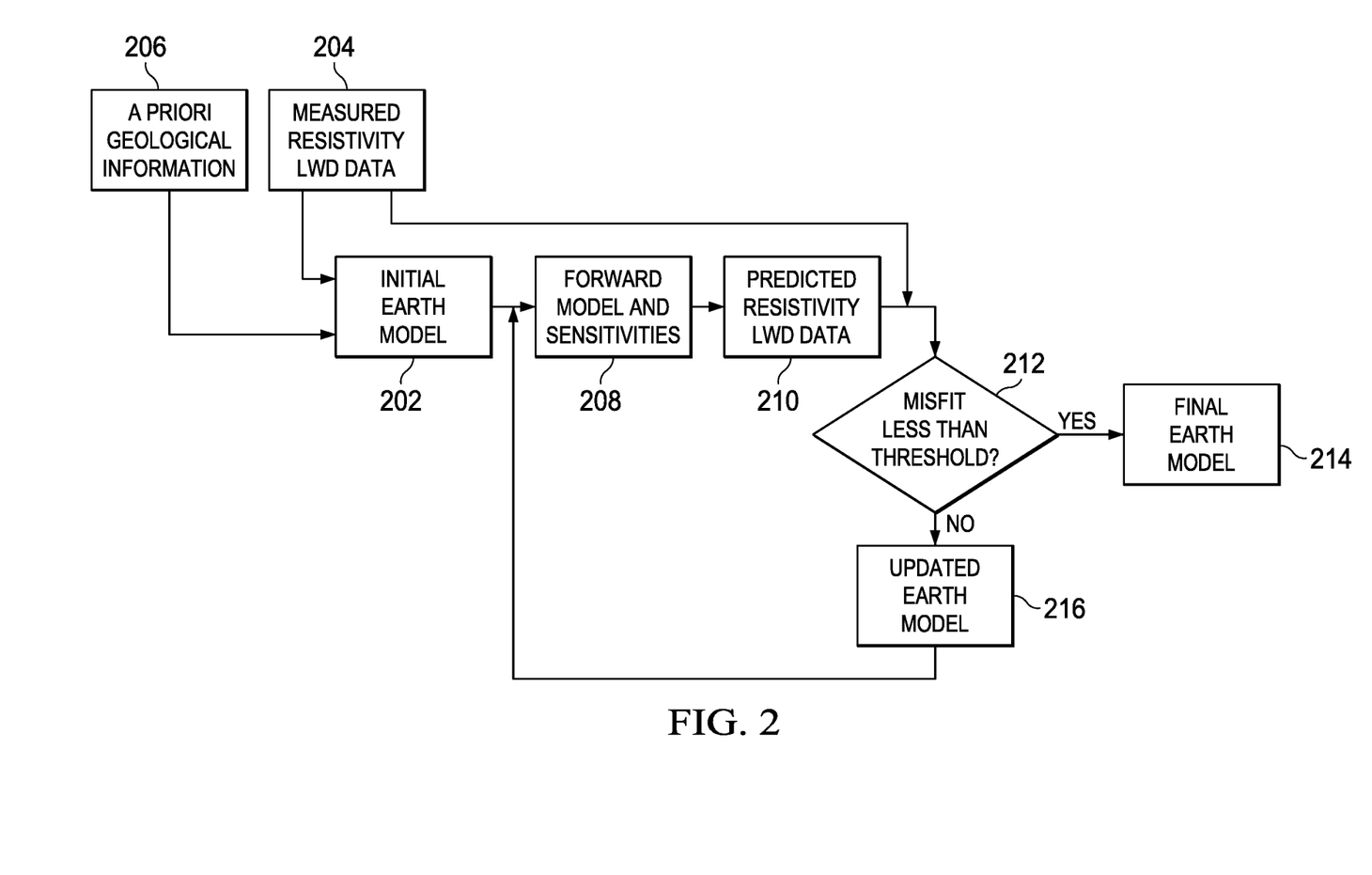
FIG. 2 is a block diagram showing a resistivity inversion according to an embodiment.

FIG. 2 is a block diagram illustrating a resistivity inversion according to an embodiment. The inversion may be a distance-to-bed-boundary (DTBB) inversion for analysis and interpretation. In this situation, a position of a well logging instrument (e.g., logging tool 126) with respect to a bed boundary (e.g., a formation layer discontinuity) is determined by inversion processing.

An initial formation model (or earth model) 202 is used. The initial formation model 202 carries an initial estimate of the geometry and/or properties of the earth formations (e.g., formations 121 of FIG. 1) surrounding a wellbore in which the well logging instrument is positioned. For example, the initial formation model 202 may be characterized by particular layer boundaries and/or particular isotropic or anisotropic values (e.g., resistivity values). Electromagnetic (EM) attributes of the initial formation model 202 may include resistivity, conductivity, permittivity, permeability, chargeability, and/or other induced polarization (IP) parameters. The EM attributes may be isotropic or anisotropic. A layer dip may be recovered from the orientation of the well logging instrument with respect to the 1D resistivity model.

The initial formation model 202 may represent the earth formations surrounding the wellbore as a series of layers or strata, demarcated by boundaries between contiguous layers. In the model 202, physical properties of the individual layers in the model may include, e.g., resistivity (or conductivity) of each layer, a thickness of each layer, and a selected number of layers above and/or below a layer of interest. In at least some situations, the layer of interest is the layer in which the well logging instrument is positioned in the wellbore.

To refine the model 202, measurement data 204 collected by the well logging instrument is input to the model. The measurement data 204 reflects a response of the earth formations to transmissions by the well logging instrument. For example, the measurement data 204 may include measured resistivity LWD data. According to at least some embodiments, other information is input to the model 202. The additional information may include a priori geological information 206, such as surfaces interpreted from seismic analysis (e.g., 3D seismics), well ties, and/or adjacent wells. According to at least some embodiments, the information 206 regards the model 202 as derived from interpretation and/or analysis of prior EM surveys (e.g., marine controlled-source EM surveys, borehole-to-surface EM surveys, cross-well EM surveys). Although the resolution of such information may be lower than the resolution of well logs, such information may still provide useful information regarding general structural trends. In general, the information 206 may be imposed on the model 202 (e.g., in a selective manner) as data weights, model weights, regularization, model constraints and/or a priori models.

Based on the measurement data 204 (and, in at least some embodiments, the a priori information 206), a predicted formation model 208 is generated. The predicted formation model 208 provides a predicted response of the earth formations. The predicted response is converted into a set of inversion parameters, which are then used to estimate (or predict) data 210 of the formations. For example, the estimated data 210 may include resistivity characteristics of the formations.

The resistivity LWD inversion may be based on one or more stochastic optimization algorithms including, e.g., Monte Carlo (MC), Markov Chain Monte Carlo (MCMC), Nearest Neighbor (NN), Genetic Algorithm (GA), or Simulated Annealing (SA) algorithms. Stochastic optimization algorithms extensively search the solution space for global minima and provide statistical information about the earth model parameters. These algorithms are essentially "physics free," in that models are guided on the basis of statistics only, and are not guided by any model sensitivity analysis.

As another example, the resistivity LWD inversion may be based on one or more deterministic optimization algorithms including, but not limited to, Conjugate Gradient (CG), Non-linear Conjugate Gradient (NLCG), and Gauss-Newton (GN) algorithms. Deterministic optimization algorithms are "physics based," in that models are guided by model sensitivity analysis. Deterministic optimization algorithms may also yield statistical information about the earth model parameters. However, such algorithms are dependent upon their initial models, and may converge upon local and not global minima.

With continued reference to FIG. 2, at block 212, the estimated data 210 are compared against the measurement data 204. As described earlier, the measurement data 204 reflect the measured response of the earth formations. A difference(s) between the estimated data 210 and the measured response 204 is referred to as a misfit. At block 212, the difference(s) is compared against a particular threshold(s) (e.g., a preselected threshold(s)). In at least some embodiments, the value of the threshold corresponds to a level of noise that is present in the measurement data 204. If it is determined that the misfit is below the threshold, then the predicted model 208 is used (or adopted) as a final predicted model 214.

However, if it is determined that the misfit is equal to or above the threshold, then one or more parameters of the predicted model 208 are adjusted. For example, a level of the misfit is used to update (or adjust) parameters of the predicted model 208, such that adjustments 216 to the predicted model 208 are generated. The predicted model 208 is updated accordingly. The updated model 208 provides a predicted response of the earth formations. The predicted response is converted into a set of inversion parameters, which are then used to estimate data 210 of the formations. The estimated data 210 is then compared against the measurement data 204. As illustrated in FIG. 2, the described adjustment of block 216 and comparison of block 212 are repeated, until the misfit is below the threshold.

The resistivity inversion illustrated in FIG. 2 may be performed on a "point by point" basis. In more detail, in the wellbore, the well logging instrument may measure data at (or around) two or more locations located in the wellbore (e.g., along a drilling axis). For each of the locations in the wellbore, the resistivity inversion of FIG. 2 is performed using the data measured at the location. Further, for each location, a predicted model (e.g., model 214) providing estimated data that is sufficiently close to the measured data is determined. Accordingly, for a particular number of locations, an equal number of final predicted models 214 are generated. The final models may be 1D resistivity models. These 1D resistivity models may then be stitched together to form a 2D resistivity image of the formation. This 2D image is commonly referred to as a "curtain plot."

According to the block diagram of FIG. 2, a single initial model 202 is considered. More specifically, only a single initial model is used (and perhaps adjusted) for each logging point, resulting in a single predicted model for the logging point. According to a further example, two or more initial models are considered for each logging point. In this situation, two or more resistivity inversions are performed independently of one another. Accordingly, two or more predicted models are generated for each logging point.

Figure 3:
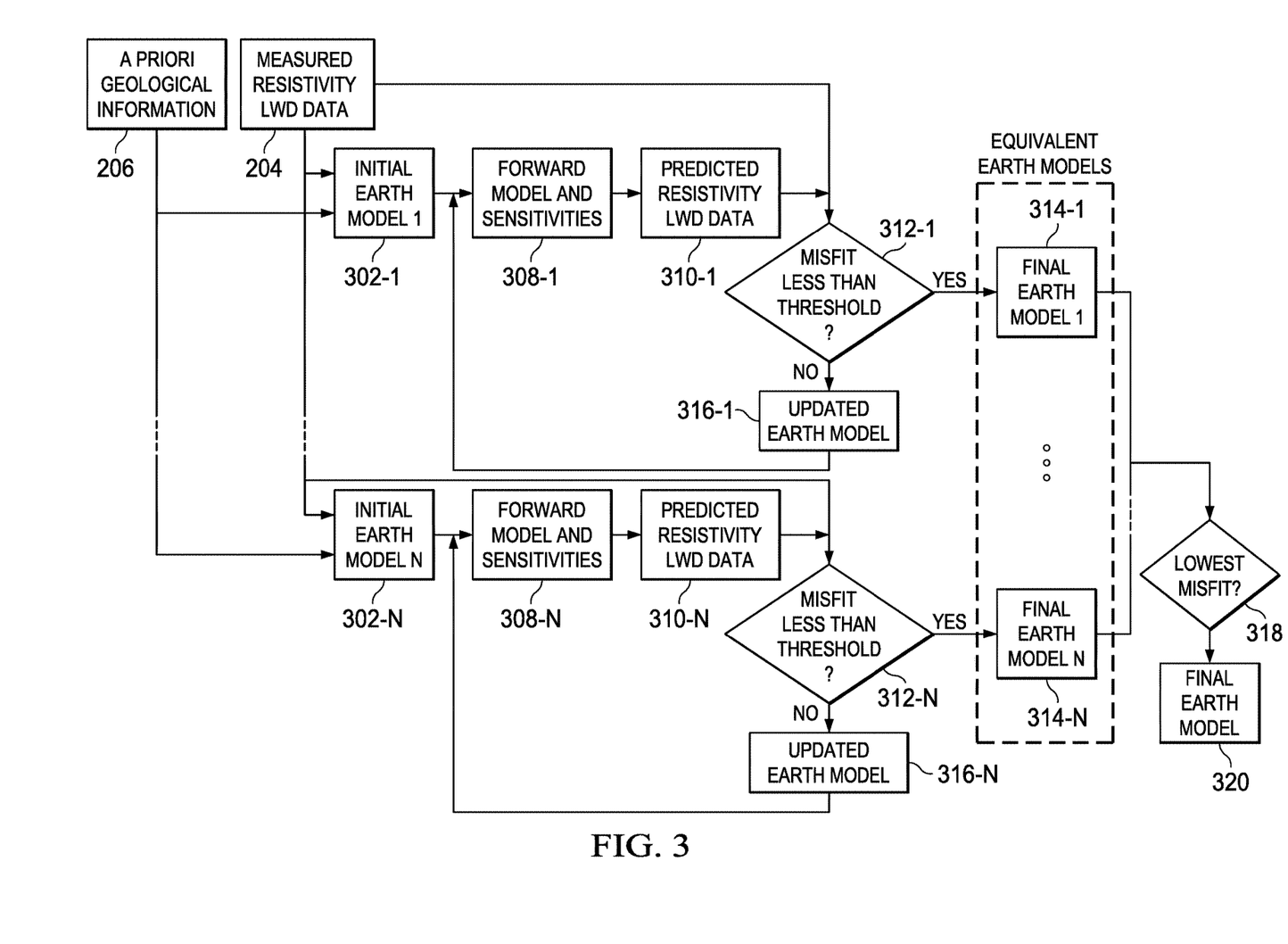
FIG. 3 is a block diagram showing selection of a formation model from among multiple generated formation models.

FIG. 3 is a block diagram showing selection of a formation model from among multiple generated formation models. As illustrated in FIG. 3, two or more initial models 302-1 . . . 302-N are considered. The initial models 302-1 . . . 302-N are different from each other. For example, each of the initial models 302-1 . . . 302-N may reflect a different combination of, e.g., resistivity models, tool placement with respect to layers of the model, and/or predicted model parameters defined from apparent logs or other a priori information. In other aspects, each of the models 302-1 . . . 302-N is similar to model 202 of FIG. 2, and, therefore, will not be described in further detail below.

Based on the initial models 302-1, . . . , 302-N, respectively, final predicted models 314-1, . . . , 314-N are generated. For example, just as blocks 208, 210, 212, 216 are performed to generate the final predicted model 214 of FIG. 2, blocks 308-1, 310-1, 312-1, 316-1 are performed to generate a final predicted model 314-1. Similarly, blocks 308-N, 310-N, 312-N, 316-N are performed to generate a final predicted model 314-N. Generation of each of the final predicted models 314-1, . . . , 316-N may include performing a resistivity inversion. The resistivity inversion may be based on a stochastic optimization algorithm and/or a deterministic optimization algorithm.

Each of the final predicted models 314-1, . . . , 316-N is characterized by a corresponding misfit. The final predicted models 314-1, . . . , 316-N are said to be equivalent (or non-unique), in that the respective misfits that characterize the models all fall below a particular threshold (e.g., the threshold corresponding to blocks 312-1, . . . , 312-N). The threshold may correspond to the level of noise that is present in the measurement data 204. The equivalency of the models may be due to, e.g., a lack of sufficient measurement sensitivity, modeling errors, and/or noise in the data.

When analysis of a formation results produces multiple models that are equivalent, one of the models may be selected as being optimal (e.g., better than the remaining models in at least one aspect, such as geological accuracy). In the embodiment of FIG. 3, the particular values of the misfits are utilized to select an optimal model. At block 318, the values of the misfits that characterize the models 314-1, . . . , 316-N are analyzed. The model that has the lowest misfit is selected as the optimal predicted model 320.

Similar to the resistivity inversion illustrated in FIG. 2, the selection illustrated in FIG. 3 may also be performed on a "point by point" basis. Accordingly, for a number of multiple locations, an equal number of optimal predicted models 320 are generated. These 1D resistivity models may then be stitched together to form a 2D resistivity image (or "curtain plot") of the formation.

When the underlying models (e.g., model 320) are chosen strictly based on a degree of misfit, the resulting 2D resistivity images may contain artefacts that are geologically unrealistic. This may occur, e.g., because the selection of block 318 does not consider a degree of spatial similarity of any of the models (e.g., models 314-1, . . . , 314-N) with respect to another model that is projected upon a path of the wellbore (or well path). When 2D resistivity images contain such artefacts, the images may have little (or insufficient) resemblance to actual earth models. The appearance of a large number of artefacts erodes confidence in the quality of the modeling results. For example, a large number of artefacts in a well log erodes an interpreter's confidence in the resistivity LWD inversion.

As described earlier with reference to FIG. 3, the model 320 is selected purely based on the lowest misfit. The selection of model 320 does not take into consideration a spatial correlation between the model 320 and another model that is projected upon a path of the well path (e.g., another model that is based on one or more sources, such as, e.g., an adjacent well, an adjacent structural earth model, and/or a geocellular model).

In general, information regarding one or more adjacent wells is useful. Potentially strong correlations exist between adjacent wells, in the presence of a piece-wise continuously varying geology between the wells. Such correlations may be weaker for wells located in structurally complex formations (e.g., faulted formations, tilted formations, etc.).

In addition, other sources of information may be useful. For example, well logs that are acquired, e.g., using LWD or wireline methods, may provide relatively high resolution (e.g., resolution in the order of <1 foot) of a formation about the well path with accurate (measured and total) depth control. As another example, seismic data may often be available when a well is drilled. In this situation, depth converted, well-tied seismic stratigraphic and seismic attribute models may provide relatively coarse resolution (e.g., resolution on the order of ~50 feet) of the formation over an entire reservoir structure.

During geosteering, earth models may be constructed along a well path based on earth models and/or data (e.g., from adjacent wells) that are projected upon the well path. For example, the earth models may be constructed based on analysis of LWD and/or wireline data from adjacent wells, seismic data, and/or geocellular models. Further, the earth models and/or data that are projected upon the well path may be used to constrain the generation of earth models at a subsequent location.

Aspects of the disclosure are directed to analyzing a spatial correlation between (i) an earth model generated for a wellbore with respect to a particular location (e.g., any of equivalent models 314-1, . . . , 314-N) and (ii) at least one other earth model. The other earth model may characterize another well (e.g., an adjacent well) and may be projected upon the well path of the wellbore. From among the equivalent earth models generated for the particular location, one model is selected based at least on a determination that the model has a sufficiently strong (e.g., strongest) degree of spatial correlation with respect to the other model. This increases the likelihood that the selected model is more geologically reasonable (or plausible) than unselected models. Sedimentary formations generally exhibit slowly varying spatial variations in their lithological interfaces and physical properties. Therefore, it may be reasonable to expect that there are strong correlations (in physical properties) between adjacent wells or collocated earth models.

Various embodiments will now be described in more detail with reference to FIG. 4, which shows an illustrative LWD environment 400.

For a particular location in a wellbore 402, two or more earth models are generated. The earth models may be generated using measurement(s) taken by a resistivity LWD tool (e.g., logging tool 126) that is positioned in the wellbore 402. In at least one embodiment, these earth models are similar to the final predicted models of FIG. 3. As described earlier with reference to FIG. 3, final predicted models (e.g., models 314-1, . . . , 314-N) are generated based, respectively, on initial models (e.g., models 302-1, . . . , 302-N). The generation of the earth models may be based on stochastic and/or deterministic optimization techniques. Each of the earth models may be parameterized as layered earth models characterized by, e.g., at least one layer depth, at least two layer resistivity values (which may be anisotropic), and one layer dip.

The generated earth models are equivalent in that the respective misfits that characterize the models all fall below a particular threshold. Furthermore, the earth models may have undergone a spatial continuity analysis, such as that described in co-pending International Application No. PCT/US2016/018009, titled "Methods of Selecting an Earth Model from a Plurality of Earth Models," and filed Feb. 16, 2016, and may have been selected based on a spatial continuity with respect to models corresponding to at least one different location (or point) in the wellbore (e.g., wellbore 402).

Similarly, at least one model is generated for a well 404 and/or well 406. Each of the wells 404, 406 is adjacent to the wellbore 402. The horizontal separation between the wells 402 and 404 (or 402 and 406) may depend on the structure or the reservoir. For example, in structures such as shales, Steam Assisted Gravity Drainage (SAGD) reservoirs, etc., the horizontal separation may be on the order of hundreds of meters. As another example, in SAGD reservoirs in particular locations (e.g., Canada), horizontal multilateral wells may be as close as approximately 50 m apart (horizontally).

The earth model for the well 404 (or the well 406) is projected upon the well path of the wellbore 402. For example, at least one model parameter of the earth model for the well 404 (or the well 406) is projected upon the well path of the wellbore 402. The projection may be a scalar projection based on linear or nonlinear spatial functions for extrapolating or interpolating the model parameter from the well path of the well 404 to the well path of the wellbore 402. For example, in at least one embodiment, the projection may be based on spatially statistical methods (e.g., geostatistics) of extrapolating or interpolating the model parameter.

With respect to the wellbore 402, a vector m may denote one or more parameters of a corresponding model (e.g., any of models 314-1, . . . , 314-N). A different vector ($m_p$) may denote one or more corresponding projected parameters of another model (e.g., a parameter of an earth model for the well 404 that is projected upon the well path of wellbore 402).

As described earlier, a spatial correlation is determined between (i) an earth model generated for a wellbore with respect to a particular location (e.g., any of equivalent models 314-1, . . . , 314-N) and (ii) at least one other earth model that characterizes another well (e.g., an adjacent well). According to particular embodiments, the spatial correlation is determined as a discrete cross-correlation of m and $m_p$. As captured in Expression (1) below, a maximum result of the cross-correlation is identified:

$$(m*m_p)[j]=\Sigma_{i=-\infty}^{\infty} m*[i]m_p[i+j] \rightarrow \max. \quad (1)$$

According to at least one embodiment, the summation of the discrete cross-correlation of Expression (1) is performed over a subset (or portion) of the well path of wellbore 402. For example, the subset of the well path may be based on a maximum length scale/sensitivity of the resistivity LWD tool (e.g., logging tool 126).

The earth model (e.g., the model 314-1, . . . , 314-N) that results in the highest degree of spatial correlation with respect to the projected earth model is selected as an optimal model.

Figure 5:
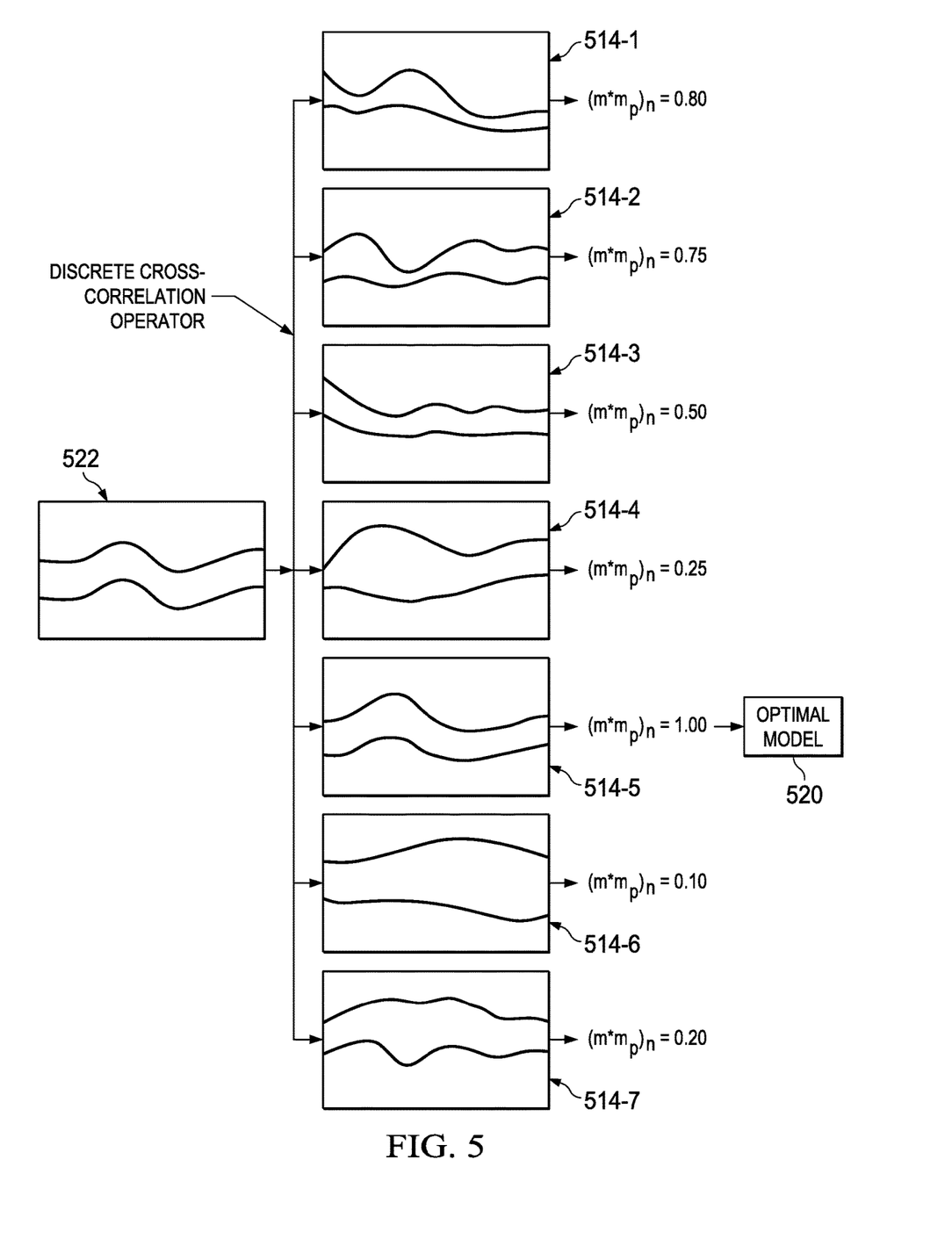
FIG. 5 shows an illustrative scenario in which one of multiple equivalent earth models is selected based on a degree of spatial correlation.

For illustrative purposes, the noted selection will now be described with reference to FIG. 5. FIG. 5 shows an illustrative scenario in which one of multiple equivalent earth models is selected based on a spatial correlation (e.g., a discrete cross-correlation according to Expression (1)) with at least one projected earth model.

Figure 4:
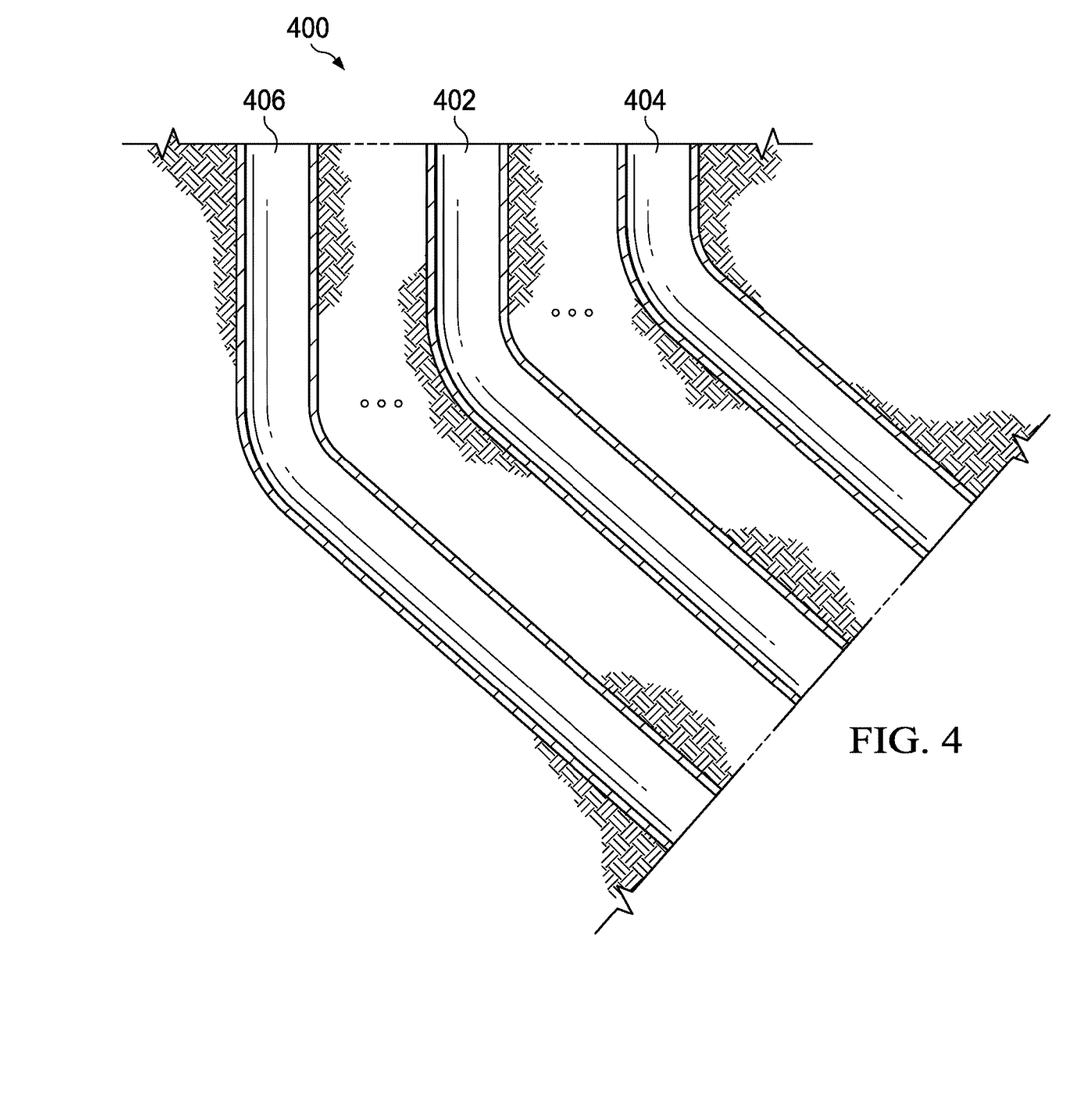
FIG. 4 shows an illustrative LWD environment.

During LWD operations, a well logging instrument (e.g., logging tool 126) is positioned at a particular location in a wellbore (e.g., wellbore 402 of FIG. 4). For this location, final predicted models 514-1, 514-2, 514-3, 514-4, 514-5, 514-6, 514-7 are generated. These final predicted models are similar to the models 314 of FIG. 3. For purposes of illustration, respective depictions of the formation according to the final predicted models are shown in FIG. 5.

In addition, an adjacent well (e.g., well 404 or well 406 of FIG. 4) is characterized by a similar model. The model of the adjacent well is projected upon the well path of the wellbore 402 to generate a projected model 522.

For each of the final predicted models 514-1, 514-2, 514-3, 514-4, 514-5, 514-6, 514-7, a cross-correlation with the projected model 522 is determined. For example, as described earlier with reference with Expression (1), a discrete cross-correlation is determined between (i) at least one parameter of the final predicted model (m) and (ii) at least one corresponding parameter of the projected model 522 ($m_p$). Each result may be normalized based on a value of maximum cross-correlation (N), such that the results of the cross-correlations range between 0 and 1. The final predicted model(s) that produces the largest normalized result is selected as the optimal model 520.

With reference to FIG. 5, the cross-correlation between (i) a parameter (e.g., a resistivity value) of the model 514-1 and (ii) a corresponding parameter of the projected model 522 produces a normalized result of 0.80. The cross-correlation between (i) the parameter of the model 514-2 and (ii) the corresponding parameter of the projected model 522 produces a normalized result of 0.75. The cross-correlation between (i) the parameter of the model 514-3 and (ii) the corresponding parameter of the projected model 522 produces a normalized result of 0.50. The cross-correlation between (i) the parameter of the model 514-4 and (ii) the corresponding parameter of the projected model 522 produces a normalized result of 0.25. The cross-correlation between (i) the parameter of the model 514-5 and (ii) the corresponding parameter of the projected model 522 produces a normalized result of 1.00. The cross-correlation between (i) the parameter of the model 514-6 and (ii) the corresponding parameter of the projected model 522 produces a normalized result of 0.10. Finally, the cross-correlation between (i) the parameter of the model 514-7 and (ii) the corresponding parameter of the project model 522 produces a normalized result of 0.20.

Of the models 514-1, 514-2, 514-3, 514-4, 514-5, 514-6 and 514-7—the model 514-7 results in the strongest degree of spatial correlation with respect to the projected model 522. This is consistent with the illustration in FIG. 5 that the depiction according to model 514-5 is most visually similar to the depiction according to projected model 522. Accordingly, the model 514-5 is selected as the optimal model 520. Unlike the optimal model 320 of FIG. 3, which is selected purely based on misfit, the optimal model 520 is selected based on at least a degree of spatial correlation with a projected model (e.g., projected model 522).

Alternatively, two or more models that result in degrees (or measures) of spatial correlation that are equal to or greater than a particular threshold value may be selected as optimal models. For example, with continued reference to FIG. 5, a threshold value of 0.75 may be selected. In this situation, the model 514-1 (that produces a normalized result of 0.80) and the model 514-2 (that produces a normalized result of 0.75) are selected as optimal models, in addition to the model 514-5.

With reference back to Expression (1), the vectors m and $m_p$ may denote EM attributes of the corresponding earth models (e.g., models 514-1, 514-2, 514-3, 514-4, 514-5, 514-6, 514-7, 520). As described earlier, EM attributes may include resistivity, conductivity, permittivity, permeability, chargeability, and/or other IP parameters. The EM attributes may be isotropic or anisotropic. A layer dip may be recovered from the orientation of the well logging instrument with respect to the 1D resistivity model. Alternatively (or in addition), the vectors m and $m_p$ denote one or more other properties. For example, these other properties may include the depth to one boundary, the depths to each of two boundaries and/or the dip of the boundaries.

According to at least one embodiment, the vectors m and $m_p$ denote a function of two or more properties described earlier. For example, the vectors may denote the thickness of a layer, as derived from the difference between the depths to each of two boundaries. As a further example, the vectors may denote the resistance (or conductance) of a layer, as derived from the product of the resistivity and thickness, or the anisotropy coefficient.

As described earlier, the vector $m_p$ may denote one or more projected parameters of another model. Alternatively, vector $m_p$ may denote one or more projected parameters of models of two or more wells. For example, with reference back to FIG. 4, the vector $m_p$ may result from projecting models of two or more adjacent wells (e.g., wells 404, 406) onto the well path of the wellbore 402.

Alternatively (or in addition), the vector $m_p$ may be determined as a projection from one or more adjacent wells constrained by surfaces, such as seismic or lithological surfaces within a structural or geocellular earth model. Further, the vector $m_p$ may be calculated from other well log data and/or models (e.g., density from nuclear logs, slowness from acoustic logs, porosity and fluid saturation from nuclear magnetic resonance (NMR) logs) that have been converted to resistivity-based model parameters, e.g., via analytical, empirical, or statistical rock physics relations.

Alternatively (or in addition), the vector $m_p$ may be determined as a projection from a geocellular model (e.g., a static reservoir model that characterizes petrophysical, geological, geophysical, fluid, and rock data, as spatially distributed throughout the reservoir). Further, the vector $m_p$ may be determined from petrophysical models (e.g., porosity, fluid saturations) that have been converted to resistivity-based model parameters, e.g., via analytical, empirical, or statistical rock physics relations.

Alternatively (or in addition), the vector $m_p$ may be based on acceptable or expected to perturbations from other earth model parameters. For example, an offset well that is projected to have a constant layer thickness can be perturbed (e.g., scaled by a scalar quantity such as 1.1) to permit variations, or other 2D or 3D structures such as faults, thin layers, pinching, etc. The quantity (e.g., magnitude or amplitude) of such perturbations may constitute independent and additional model parameters. By observing how much a change in a model parameter causes a change in the result of the correlation, a sensitivity is assessed.

Although Expression (1) utilizes a discrete cross-correlation of m and $m_p$, it is understood that other measures of similarity may be utilized. For example, a convolution, correlation, and/or a coherency function may be performed, and a maximum result may be identified.

According to at least one embodiment, a set of equivalent earth models (e.g., models 314-1, ..., 314-N) are projected to a 2D (pixel) resistivity model in coordinates of measured depth (MD) and true vertical depth (TVD), e.g., ρ(MD, TVD), where ρ denotes resistivity, and (MD, TVD) denote coordinates of a trajectory. In this situation, the equivalent earth model that maximizes a 2D discrete cross-correlation function is selected as an optimal model. According to another embodiment, the equivalent earth models are (1D or 2D) cross-correlated with other LWD or wireline data/logs. In this situation, the cross-correlation need not be based on derived earth model parameters.

Figure 6:
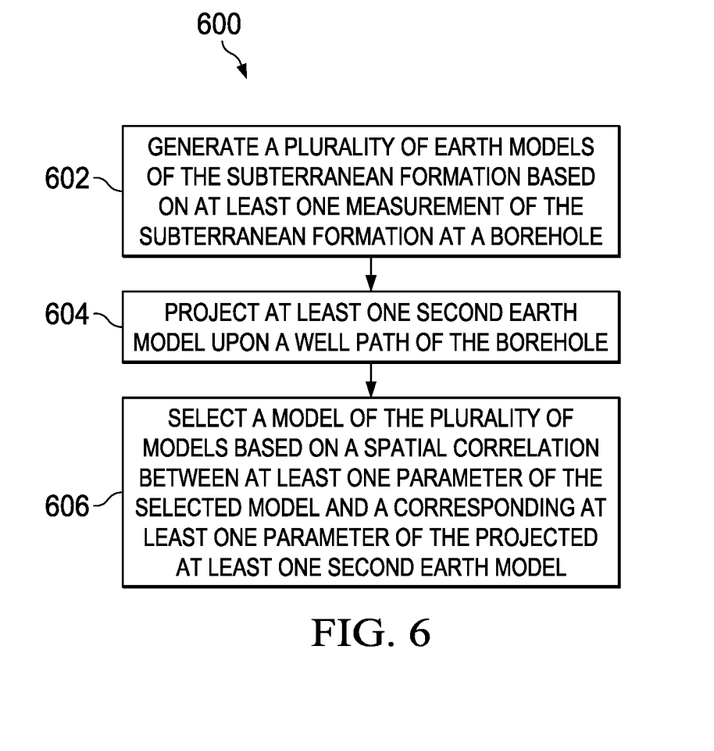
FIG. 6 is a flowchart showing an illustrative selection method based on a degree of spatial correlation.

FIG. 6 is a flowchart showing an illustrative selection method 600 based on a degree of spatial correlation between earth models. In the method 600, a plurality of earth models of a subterranean formation are generated at block 602. The earth models (e.g., models 514-1, 514-2, 514-3, 514-4, 514-5, 514-6, 514-7 of FIG. 5) are generated based on at least one measurement (e.g., a resistivity measurement) of the subterranean formation at a borehole (e.g., borehole 402 of FIG. 4). At block 604, at least one second earth model is projected upon a well path of the borehole. With reference back to FIG. 4, the second earth model may characterize adjacent well 404 (or adjacent well 406). At block 606, one of the plurality of earth models is selected. The selection is based on a spatial correlation between at least one parameter of the selected model and a corresponding at least one parameter of the projected second earth model. For example, the selection is based on a determination that the selected model has a strongest degree of spatial correlation with the projected second earth model. As another example, the selection is based on a determination that the selected model has a degree (or measure) of spatial correlation that is equal to or greater than a particular threshold.

Embodiments disclosed herein include:

A: A logging system that includes an electromagnetic logging tool that collects at least one measurement of a subterranean formation at a borehole. The logging system also includes a processing system that generates a plurality of earth models of the subterranean formation based on the at least one measurement of the subterranean formation. The processing system projects at least one second earth model upon a well path of the borehole, and selects a model of the plurality of earth models based on a spatial correlation between at least one parameter of the selected model and a corresponding at least one parameter of the projected at least one second earth model.

B. A method that includes generating a plurality of earth models of the subterranean formation based on at least one measurement of the subterranean formation at a borehole. The method further includes projecting at least one second earth model upon a well path of the borehole. The method further includes selecting a model of the plurality of earth models based on a spatial correlation between at least one parameter of the selected model and a corresponding at least one parameter of the projected at least one second earth model.

Each of the embodiments, A and B, may have one or more of the following additional elements in any combination. Element 1: wherein: a misfit of each model of the plurality of earth models is less than a particular threshold value, the misfit based on a difference between the at least one measurement of the subterranean formation and a predicted measurement based on the corresponding model; and the selection based on the spatial correlation improves a likelihood that the selected model is more geologically accurate than at least one other of the plurality of earth models, relative to selecting based on the misfit alone. Element 2: wherein: the processing system projects the at least one second earth model by spatially extrapolating or interpolating the corresponding at least one parameter from at least one second well path to the well path of the borehole; and the spatial extrapolation or interpolation is based on at least a spatial function or a spatially statistical function. Element 3: wherein the at least one second earth model corresponds to at least one well adjacent to the borehole, or comprises a geocellular earth model. Element 4: wherein, among the plurality of earth models, the selected model has a strongest degree of spatial correlation with the projected at least one second earth model. Element 5: wherein the processing system selects the model by performing at least a cross-correlation, a convolution, or a coherence between the at least one parameter of the selected model and the corresponding at least one parameter of the projected at least one second earth model. Element 6: wherein the processing system selects the model by performing a discrete cross-correlation between the at least one parameter of the selected model and the corresponding at least one parameter of the projected at least one second earth model over a subset of the well path of the borehole.

Element 7: wherein: a misfit of each model of the plurality of earth models is less than a particular threshold value, the misfit based on a difference between the at least one measurement of the subterranean formation and a predicted measurement based on the corresponding model; and the selection based on the spatial correlation improves a likelihood that the selected model is more geologically accurate than at least one other of the plurality of earth models, relative to selecting based on the misfit alone. Element 8: wherein the selected threshold is based on a noise level corresponding to the at least one measurement. Element 9: wherein the at least one measurement comprises a resistivity measurement. Element 10: wherein generating the plurality of earth models comprises performing a plurality of resistivity inversions based on the at least one measurement, the plurality of resistivity inversions comprising at least a stochastic resistivity inversion or a deterministic resistivity inversion. Element 11: wherein projecting the at least one second earth model comprises spatially extrapolating or interpolating the corresponding at least one parameter from at least one second well path to the well path of the borehole. Element 12: wherein the spatial extrapolation or interpolation is based on at least a spatial function or a spatially statistical function. Element 13: wherein the at least one second earth model corresponds to at least one well adjacent to the borehole, or comprises a geocellular earth model. Element 14: wherein, among the plurality of earth models, the selected model has a strongest degree of spatial correlation with the projected at least one second earth model. Element 15: wherein the selected model has a degree of spatial correlation that is above a particular threshold. Element 16: wherein selecting the model comprises performing at least a cross-correlation, a convolution, or a coherence between the at least one parameter of the selected model and the corresponding at least one parameter of the projected at least one second earth model. Element 17: wherein selecting the model comprises performing a discrete cross-correlation between the at least one parameter of the selected model and the corresponding at least one parameter of the projected at least one second earth model over a portion of the well path of the borehole. Element 18: wherein the portion of the well path is based on a sensitivity of a source of the at least one measurement.

Numerous variations and modifications will become apparent to those skilled in the art once the above disclosure is fully appreciated. The methods and systems can be used for drilling, logging and/or other operations where a particular formation model is to be selected from two or more formation models (e.g., equivalent formation models). The ensuing claims are intended to cover such variations where applicable.

What is claimed is:

1. A method of modeling a subterranean formation, the method comprising:
    generating a plurality of earth models of the subterranean formation based on at least one measurement of the subterranean formation at a borehole;
    projecting at least one second earth model upon a well path of the borehole;
    selecting a model of the plurality of earth models based on a spatial correlation between at least one parameter of the selected model and a corresponding at least one parameter of the projected at least one second earth model, wherein the projecting the at least one second earth model upon the well path of the borehole comprises performing a discrete cross-correlation between the at least one parameter of the selected model and the corresponding at least one parameter of the projected at least one second earth model over a portion of the well path of the borehole; and geosteering based on the selected model based on the spatial correlation between the at least one parameter of the selected model and the corresponding at least one parameter of the projected at least one second earth model.

2. The method of claim 1, wherein:

a misfit of each model of the plurality of earth models is less than a particular threshold value, the misfit based on a difference between the at least one measurement of the subterranean formation and a predicted measurement based on the corresponding model; and the selection based on the spatial correlation improves a likelihood that the selected model is more geologically accurate than at least one other of the plurality of earth models, relative to selecting based on the misfit alone.

3. The method of claim 2, wherein the selected threshold is based on a noise level corresponding to the at least one measurement.

4. The method of claim 1, wherein the at least one measurement comprises a resistivity measurement.

5. The method of claim 4, wherein generating the plurality of earth models comprises performing a plurality of resistivity inversions based on the at least one measurement, the plurality of resistivity inversions comprising at least a stochastic resistivity inversion or a deterministic resistivity inversion.

6. The method of claim 1, wherein projecting the at least one second earth model comprises spatially extrapolating or interpolating the corresponding at least one parameter from at least one second well path to the well path of the borehole.

7. The method of claim 6, wherein the spatial extrapolation or interpolation is based on at least a spatial function or a spatially statistical function.

8. The method of claim 1, wherein the at least one second earth model corresponds to at least one well adjacent to the borehole, or comprises a geocellular earth model.

9. The method of claim 1, wherein, among the plurality of earth models, the selected model has a strongest degree of spatial correlation with the projected at least one second earth model.

10. The method of claim 1, wherein the selected model has a degree of spatial correlation that is above a particular threshold.

11. The method of claim 1, wherein selecting the model comprises performing at least a cross-correlation, a convolution, or a coherence between the at least one parameter of the selected model and the corresponding at least one parameter of the projected at least one second earth model.

12. The method of claim 1, wherein the portion of the well path is based on a sensitivity of a source of the at least one measurement.

13. A logging system comprising:
an electromagnetic logging tool that collects at least one measurement of a subterranean formation at a borehole; and
a processing system that:
generates a plurality of earth models of the subterranean formation based on the at least one measurement of the subterranean formation;
projects at least one second earth model upon a well path of the borehole;
selects a model of the plurality of earth models based on a spatial correlation between at least one parameter of the selected model and a corresponding at least one parameter of the projected at least one second earth model, wherein the processing system projects the at least one second earth model upon the well path of the borehole by performing a discrete cross-correlation between the at least one parameter of the selected model and the corresponding at least one parameter of the projected at least one second earth model over a portion of the well path of the borehole; and
geosteers based on the selected model based on the spatial correlation between the at least one parameter of the selected model and the corresponding at least one parameter of the projected at least one second earth model.

14. The logging system of claim 13, wherein:
a misfit of each model of the plurality of earth models is less than a particular threshold value, the misfit based on a difference between the at least one measurement of the subterranean formation and a predicted measurement based on the corresponding model; and
the selection based on the spatial correlation improves a likelihood that the selected model is more geologically accurate than at least one other of the plurality of earth models, relative to selecting based on the misfit alone.

15. The logging system of claim 13, wherein:
the processing system projects the at least one second earth model by spatially extrapolating or interpolating the corresponding at least one parameter from at least one second well path to the well path of the borehole; and
the spatial extrapolation or interpolation is based on at least a spatial function or a spatially statistical function.

16. The logging system of claim 13, wherein the at least one second earth model corresponds to at least one well adjacent to the borehole, or comprises a geocellular earth model.

17. The logging system of claim 13, wherein, among the plurality of earth models, the selected model has a strongest degree of spatial correlation with the projected at least one second earth model.

18. The logging system of claim 13, wherein the processing system selects the model by performing at least a cross-correlation, a convolution, or a coherence between the at least one parameter of the selected model and the corresponding at least one parameter of the projected at least one second earth model.

* * * * *